US012669603B2

(12) United States Patent     (10) Patent No.:   US 12,669,603 B2

Youssef     (45) Date of Patent:   Jun. 30, 2026

(54) METHOD AND SYSTEM FOR ESTIMATING RANGE WITH ULTRASOUND

(71) Applicant: INVENSENSE, INC, San Jose, CA (US)

(72) Inventor: Joe Youssef, Noyarey (FR)

( * ) Notice: Subject to any disclaimer, the term of this patent is extended or adjusted under 35 U.S.C. 154(b) by 103 days.

(21) Appl. No.: 18/942,168

(22) Filed: Nov. 8, 2024

(65) Prior Publication Data

US 2025/0199167 A1     Jun. 19, 2025

Related U.S. Application Data

(60) Provisional application No. 63/610,753, filed on Dec. 15, 2023.

(51) Int. Cl.
    *G01S 15/10*       (2006.01)
    *G01S 7/527*       (2006.01)
    *G01S 15/52*       (2006.01)
(52) U.S. Cl.
    CPC .......... *G01S 15/101* (2013.01); *G01S 7/5273* (2013.01); *G01S 15/52* (2013.01)

(58) Field of Classification Search
    CPC ....... G01S 15/101; G01S 7/5273; G01S 15/52
    See application file for complete search history.

(56) References Cited

U.S. PATENT DOCUMENTS

| | | | | |
|---|---|---|---|---|
| 5,455,805 | A | * | 10/1995 | Etienne .................. G01N 29/40 367/900 |
| 6,987,707 | B2 | * | 1/2006 | Feintuch ................. G01S 15/04 367/87 |
| 2025/0199167 | A1 | * | 6/2025 | Youssef .................. G01S 15/52 |

FOREIGN PATENT DOCUMENTS

| | | | | |
|---|---|---|---|---|
| CA | 2870206 | A1 | * | 11/2013 ........... G01N 29/043 |

* cited by examiner

*Primary Examiner* — Daniel Pihulic

(57) ABSTRACT

Methods and systems are disclosed for employing an ultrasonic sensor to estimate a range for a moving object. At least one processor separates returned signals received by an ultrasonic transducer into a stationary object signal and a moving object signal. A gain is determined based at least in part on the stationary object signal. The stationary object signal is combined with the moving object signal using the gain and then filtered. The range for the moving object is estimated using the filtered combined stationary and moving object signal.

23 Claims, 8 Drawing Sheets

METHOD AND SYSTEM FOR ESTIMATING RANGE WITH ULTRASOUND

CROSS-REFERENCE TO RELATED APPLICATIONS

This application claims priority to U.S. Provisional Patent Application No. 63/610,753, filed Dec. 15, 2023, the content of which is incorporated by reference in its entirety.

FIELD OF THE PRESENT DISCLOSURE

This invention relates to the use of an ultrasonic transducer to classify objects as stationary and more particularly to distinguish such stationary objects from a user.

BACKGROUND

A variety of devices exist which utilize sonic sensors (e.g., sonic emitters and receivers, or sonic transducers). By way of example, and not of limitation, a device may utilize one or more sonic sensors to track the location of the device in space, to detect the presence of objects in the environment of the device, and/or to avoid objects in the environment of the device. Such sonic sensors include transmitters which transmit sonic signals, receivers which receive sonic signals, and transducers which both transmit sonic signals and receive sonic signals. Many of these sonic transducers emit signals in the ultrasonic range, and thus may be referred to as ultrasonic transducers. Piezoelectric Micromachined Ultrasonic Transducers (PMUTs), which may be air-coupled, are one type of sonic transducer which operates in the ultrasonic range. Sonic transducers, including ultrasonic transducers, can be used for a large variety of sensing applications such as, but not limited to virtual reality controller tracking, presence detection, object detection/location, and object avoidance. For example, drones, robots, security systems, environmental or lighting systems or other devices may use ultrasonic transducers and/or other sonic transducers for control purposes in any of these or numerous other applications.

For example, devices such as computers, smartphones and others that are typically operated by a user in close proximity may benefit from presence detection to infer when a user is likely to begin operating or otherwise interacting with the device. One non-limiting illustration is when the user approaches the device, creating a motion signature that involves the tracked object getting closer and coming to rest at an expected distance at which the device is to be operated. Following detection of a motion signature matching the appropriate characteristics, the device may be activated from a low power state, which may involve a strategy known as Wake on Approach (WOA), or perform other operations associated with the anticipated user interaction. As will be discussed in further detail below, it is desirable for such presence detection techniques to be able to reliably detect moving objects and to determine their range.

Conventionally, passive infrared (PIR) sensors have been employed to detect presence but are unable to provide range information. Accordingly, using ultrasonic transducers for presence detection that provides estimations of the distance to detected objects is an attractive alternative. However, it should be appreciated that this functionality is complicated by a nearer object blocking or interfering with echoes that from more distant objects which may cause variations in the detection of the distant object, resulting in outliers that can be misinterpreted as motion. These problems may be further exacerbated when there are multiple objects and surfaces such as indoor spaces like an office or conference room that create a dense multipath echo environment.

Given the above characteristics, it would be desirable to provide systems and methods for estimating range with ultrasonic signals. Similarly, it would be desirable for such systems and methods to reliably estimate range even in crowded indoor environments. As will be described in the following materials, the techniques of this disclosure satisfy this and other needs.

SUMMARY

The disclosure is directed to a device having an ultrasonic transducer configured to emit an ultrasonic pulse and receive returned signals corresponding to the emitted ultrasonic pulse. At least one processor coupled with the ultrasonic transducer may be configured to separate the returned signals into a stationary object signal and a moving object signal, determine a gain based at least in part on the stationary object signal; combine the stationary object signal with the moving object signal using the gain, filter the combined stationary object signal and moving object signal and estimate a range for a moving object based at least in part on the filtered combined stationary and moving object signal.

This disclosure may include a sensor processing unit, including an ultrasonic transducer configured to emit an ultrasonic pulse and receive returned signals corresponding to the emitted ultrasonic pulse and at least one sensor processor coupled with the ultrasonic transducer and configured to remove a high frequency component from the returned signals using low pass filtering to generate the stationary object signal. The at least one processor may be configured to remove a low frequency component from the returned signals using high pass filtering, process the filtered signal, and remove a high frequency component to generate the moving object signal. The at least one processor may also be configured to process the filtered signal by computing an absolute value of a magnitude after removing the low frequency component or by applying a nonlinear function after removing the low frequency component.

Further, this disclosure is also directed to a method for employing an ultrasonic sensor to estimate a range for a moving object. The method may involve separating, employing at least one a processor coupled with an ultrasonic transducer, returned signals received by the ultrasonic transducer and corresponding to a pulse emitted by the ultrasonic transducer into a stationary object signal and a moving object signal, determining a gain based at least in part on the stationary object signal, combining the stationary object signal with the moving object signal using the gain; filtering the combined stationary object signal and moving object signal and estimating the range for the moving object based at least in part on the filtered combined stationary and moving object signal.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
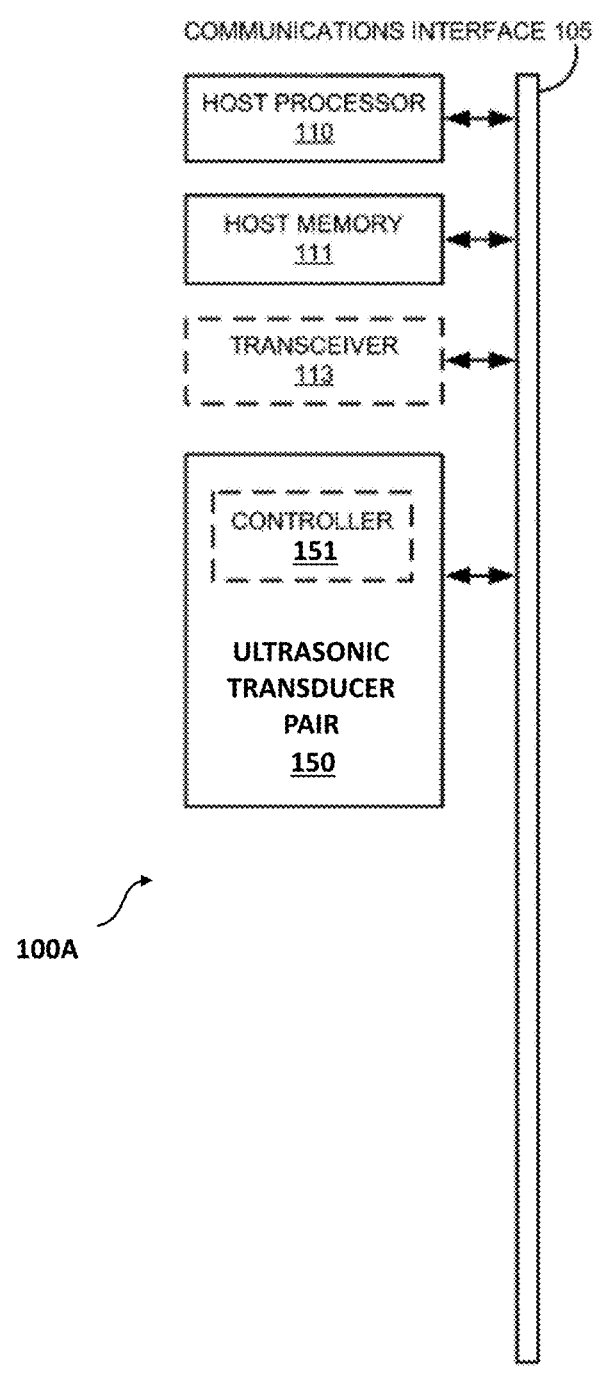
FIGS. 1A and 1B show example block diagrams of some aspects of a device which includes an ultrasonic transducer, in accordance with various embodiments.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments.

These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a Motion Processor Unit (MPU) or Sensor Processing Unit (SPU) and a microprocessor, a plurality of microprocessors, one or more microprocessors in conjunction with an MPU/SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Sonic transducers, which include ultrasonic transducers, emit a pulse (e.g., an ultrasonic sound) and then receive returned signals (i.e., echoes) after the ultrasonic waves from the emitted sound are reflected off objects or persons. In this manner, the returned signals correspond to the emitted pulse. In such a transducer, the returned signals can be used to detect the presence and/or location of objects from which the emitted pulse reflects and then returns to the transducer as a returned signal. By measuring time of flight (ToF) between emission and reception, range can be estimated with respect to one or more objects that reflect the pulse. In other instances, a first ultrasonic transducer may emit a pulse and the echoing returned signals are received by a second ultrasonic transducer.

Correspondingly, an ultrasonic transducer of a device may be used estimate range to a moving object, such as an approaching user, to draw an inference that the user about to interact with the device (or, in other contemplated embodiments, is proximate to an area of interest) and manage its operation accordingly. As one non-limiting example, the device may be a computing device such as a laptop computer. A user approaching the laptop may be identified as a moving object that closes in range until it reaches a distance suitable for interacting with the laptop. As desired, operation of the laptop may then be controlled following the identification, such as by waking from a sleep mode, activating a security login procedure or in any other suitable manner. Likewise, it will be appreciated that other devices can also benefit from these techniques. For example, environmental or lighting systems can be controlled when a user arrives within a subject area.

Herein, a variety of methods, sonic transducers, devices, and techniques are described for estimating distance to a tracked object and sequential determination may be employed to identify the tracked object as moving towards or away from a suitably equipped device. Although this technology is described herein with reference to ultrasonic transducers, it is broadly applicable to any sonic transducer which might be similarly utilized. In the detailed description, the technology is described with examples in which sonic pulses are emitted and received by a single transducer, however the technology may be implemented with a transducer which emits sonic pulses and one or more other transducers which receive returned signals that result from the emissions. Moreover, although the sensed environment where estimating range of an object takes place is often referred to as a room or indoor space in this detailed description, it should be appreciated that the techniques described are applicable to other environments.

Discussion begins with a description of notation and nomenclature. Discussion then shifts to description of some block diagrams of example components of an example devices and a sensor processing unit which may utilize an ultrasonic transducer (or other sonic transducer). The device may be any type of device which utilizes sonic sensing, for example any device which uses ultrasonic transducers may employ the techniques and methods described herein. Discussion then moves to description of a device using a sonic transducer to detect for objects in an environment and within a distance range of interest from the ultrasonic transducer. Returned signals from an emitted pulse are discussed along with methods for utilizing the returned signals to detect a stationary object in an environment of the sonic transducer. Finally, operation of the device, sensor processor, and/or components thereof are described in conjunction with description of a method of detecting a stationary object with an ultrasonic transducer.

Figure 1B:
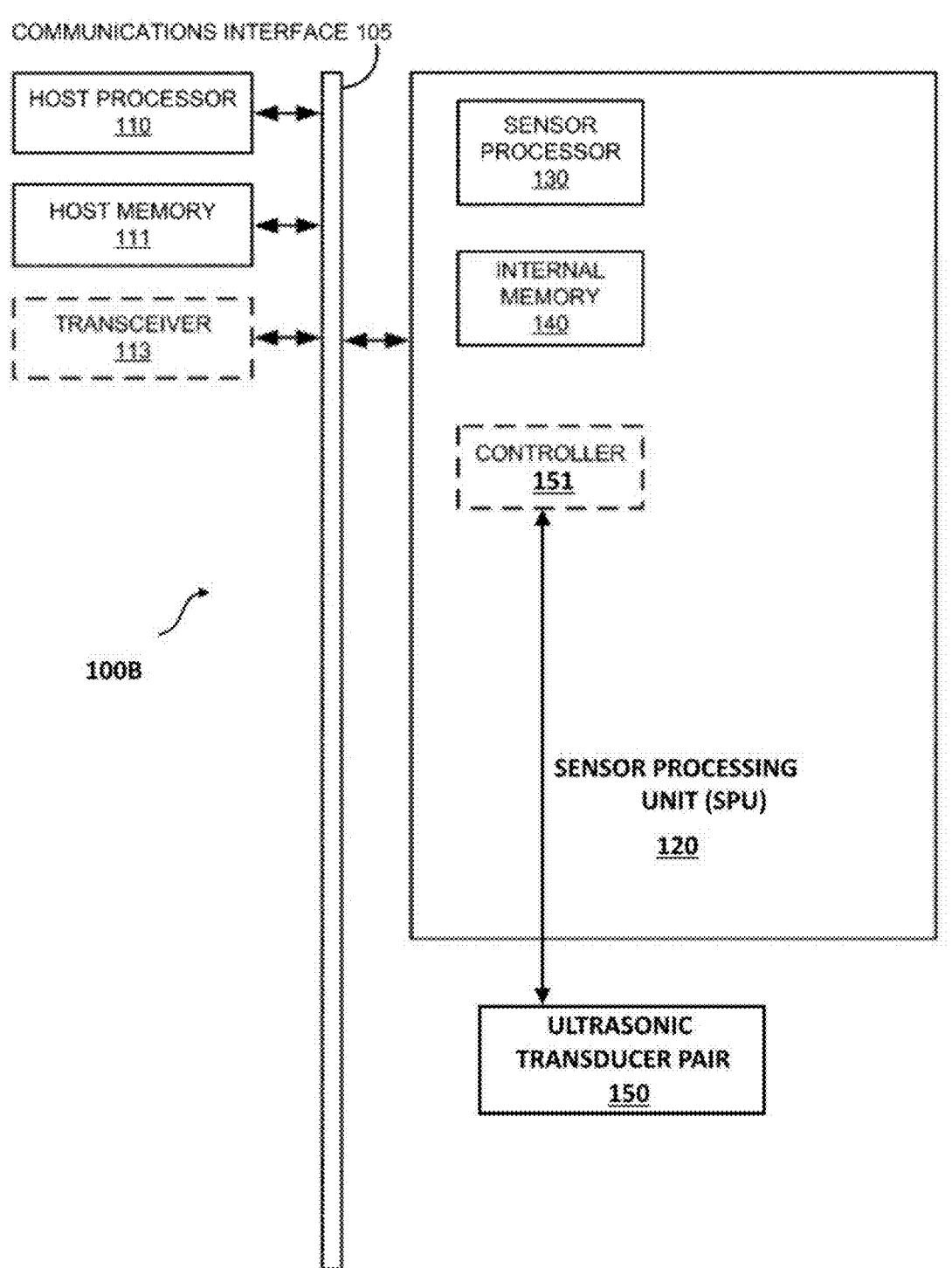

FIGS. 1A and 1B show example block diagrams of some aspects of a device 100 which includes a sonic transducer such as ultrasonic transducer 150, in accordance with various embodiments. Some examples of a device 100 may include, but are not limited to: a desktop or laptop computer, a smart phone, a tablet, a security system, a child monitor, and similar devices. These devices may be generally classified as "moving devices" and "non-moving devices." A non-moving device is one which is intended to be placed and then remain stationary in that place (e.g., a security sensor). A moving device is one which is self-mobile (e.g., a drone or delivery robot) or which may be moved easily by a human (e.g., a laptop computer). In various embodiments described herein, the techniques for estimating range of a moving object may be more readily utilized when the device 100 is stationary even if the device is otherwise self-mobile or easily moved by a human, a determination that may be made using other sensors of the device such as accelerometers or other motion sensors to help ensure that a change in range is due to motion of the tracked object rather than the device 100. By way of example, and not of limitation, the device 100 may utilize one or more ultrasonic transducers 150 to detect the presence of objects in the environment of the device 100 and to provide accurate and reliable estimations of range.

FIG. 1A shows a block diagram of components of an example device 100A, in accordance with various aspects of the present disclosure. As shown, example device 100A comprises a communications interface 105, a host processor 110, host memory 111, and at least one ultrasonic transducer 150. In some embodiments, device 100 may additionally include one a transceiver 113. Though not depicted, some embodiments of device 100A may include one or more additional sensors used to detect motion, position, or environmental context. Some examples of these additional sensors may include, but are not limited to: inertial motion sensors such as gyroscopes and accelerometers, infrared sensors, cameras, microphones, atmospheric pressure sensors, temperature sensors, and global navigation satellite system sensors (i.e., a global positioning system receiver). As depicted in FIG. 1A, included components are communicatively coupled with one another, such as, via communications interface 105.

The host processor 110 may, for example, be configured to perform the various computations and operations involved with the general function of a device 100. Host processor 110 can be one or more microprocessors, central processing units (CPUs), DSPs, general purpose microprocessors, ASICs, ASIPs, FPGAs or other processors which run software programs or applications, which may be stored in host memory 111, associated with the general and conventional functions and capabilities of device 100. In some embodiments, a host processor 110 may perform some amount of the processing of received returned signals from ultrasonic transducer 150 and/or some aspects of the methods of range estimation that are described herein. Notably, host processor 110 may implement an algorithm configured to determine whether a user is present.

Communications interface 105 may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent and may include a plurality of communications interfaces. Communications interface 105 may facilitate communication between a sensor processing unit (SPU) 120 (see e.g., FIG. 1B) and one or more of host processor 110, host memory 111, transceiver 113, ultrasonic transducer 150, and/or other included components.

Host memory 111 may comprise programs, modules, applications, or other data for use by host processor 110. In some embodiments, host memory 111 may also hold information that that is received from or provided to SPU 120 (see e.g., FIG. 1B). Host memory 111 can be any suitable type of memory, including but not limited to electronic memory (e.g., read only memory (ROM), random access memory (RAM), or other electronic memory). Host memory 111 may include instructions to implement one or more of the methods described herein using host processor 110 and ultrasonic transducer 150.

Transceiver 113, when included, may be one or more of a wired or wireless transceiver which facilitates receipt of data at device 100 from an external transmission source and transmission of data from device 100 to an external recipient. By way of example, and not of limitation, in various embodiments, transceiver 113 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications (or the like) for wireless personal area network communication), and a wired a serial transceiver (e.g., a universal serial bus for wired communication).

Ultrasonic transducer 150 is configured to emit and receive ultrasonic signals which are in the ultrasonic range. In some embodiments, a plurality of ultrasonic transducers 150 may be included and one may emit sonic signals while one or more others receive resulting signals from the emitted sonic signals. In some embodiments, ultrasonic transducer 150 may include a controller 151 for locally controlling the operation of the ultrasonic transducer 150. Additionally, or alternatively, in some embodiments, one or more aspects of the operation of ultrasonic transducer 150 or components thereof may be controlled by an external component such as host processor 110. Device 100A may contain a single ultrasonic transducer 150, or may contain a plurality of ultrasonic transducers, for example in the form of an array of ultrasonic transducers. For example, in an embodiment with a single ultrasonic transducer that is used for transmitting (e.g., emitting) and receiving, the ultrasonic transducer may be in an emitting phase for a portion of its duty cycle and in a receiving phase during another portion of its duty cycle.

Controller 151, when included, may be any suitable controller, many types of which have been described herein. In some embodiments, controller 151 may control the duty cycle (emit or receive) of the ultrasonic transducer 150 and the timing of switching between emitting and receiving. In some embodiments, a controller 151 may perform some amount of the processing of received returned signals and/or some aspects of the methods of estimating range that are described herein. For example, controller 151 may implement the user presence algorithm alone or in conjunction with host processor 110.

FIG. 1B shows a block diagram of components of an example device 100B, in accordance with various aspects of the present disclosure. Device 100B is similar to device 100A except that it includes a sensor processing unit (SPU) 120 in which ultrasonic transducer 150 is disposed. SPU 120, when included, comprises: a sensor processor 130; an internal memory 140; and at least one ultrasonic transducer 150. Though not depicted, in some embodiments, SPU 120 may additionally include one or more motion sensors and/or one or more other sensors such a light sensor, infrared sensor, GNSS sensor, temperature sensor, barometric pressure sensor, microphone, an audio recorder, a camera, etc. In some embodiments SPU 120 may trigger the operation of one or more of these other sensors in response to range estimations of an object with an ultrasonic transducer 150 from which the inference can be drawn that a user is present (e.g., an audio recorder and/or camera may be triggered to activate). In various embodiments, SPU 120 or a portion thereof, such as sensor processor 130, is communicatively coupled with host processor 110, host memory 111, and/or other components of device 100 through communications interface 105 or other well-known means. SPU 120 may also comprise one or more communications interfaces (not shown) similar to communications interface 105 and used for communications among one or more components within SPU 120.

Sensor processor 130 can be one or more microprocessors, CPUs, DSPs, general purpose microprocessors, ASICs, ASIPs, FPGAs or other processors that run software programs, which may be stored in memory such as internal memory 140 (or elsewhere), associated with the functions of SPU 120. In some embodiments, one or more of the functions described as being performed by sensor processor 130 may be shared with or performed in whole or in part by another processor of a device 100, such as host processor 110. In some embodiments, a sensor processor 130 may perform some amount of the processing of received returned signals and/or some aspects of the methods of detecting estimating range that are described herein, including coordination with a user presence detection algorithm for example.

Internal memory 140 can be any suitable type of memory, including but not limited to electronic memory (e.g., read only memory (ROM), random access memory (RAM), or other electronic memory). Internal memory 140 may store algorithms, routines, or other instructions for instructing sensor processor 130 on the processing of data output by one or more of ultrasonic transducer 150 and/or other sensors. In some embodiments, internal memory 140 may store one or more modules which may be algorithms that execute on sensor processor 130 to perform a specific function. Some examples of modules may include, but are not limited to: statistical processing modules, motion processing modules, object detection modules, object location modules, and/or decision-making modules. Modules may include instructions to implement one or more of the methods described herein using host processor 110, sensor processor 130, and/or controller 151.

Ultrasonic transducer 150, as previously described, is configured to emit and receive ultrasonic signals which are in the ultrasonic range. In some embodiments, a plurality of ultrasonic transducers 150 may be included and one may emit sonic signals while one or more others receive resulting signals from the emitted sonic signals. In some embodiments, ultrasonic transducer 150 may include a controller 151 for locally controlling the operation of the ultrasonic transducer 150. Additionally, or alternatively, in some embodiments, one or more aspects of the operation of ultrasonic transducer 150 or components thereof may be controlled by an external component such as sensor processor 130 and/or host processor 110. Ultrasonic transducer 150 is communicatively coupled with sensor processor 130 by a communications interface (such as communications interface 105), bus, or other well-known communication means.

Controller 151, when included, may be any suitable controller, many types of which have been described herein. In some embodiments, controller 151 may control the duty cycle (emit or receive) of the ultrasonic transducer 150 and the timing of switching between emitting and receiving. In some embodiments, a controller 151 may perform some amount of the processing of received returned signals, may perform some aspects of the methods of estimating range that are described herein, and/or may interpret and carryout instructions received from external to ultrasonic transducer 150. As noted above, controller 151 may implement the user presence algorithm alone or in conjunction with host processor 110 and/or sensor processor 130.

Figure 2:
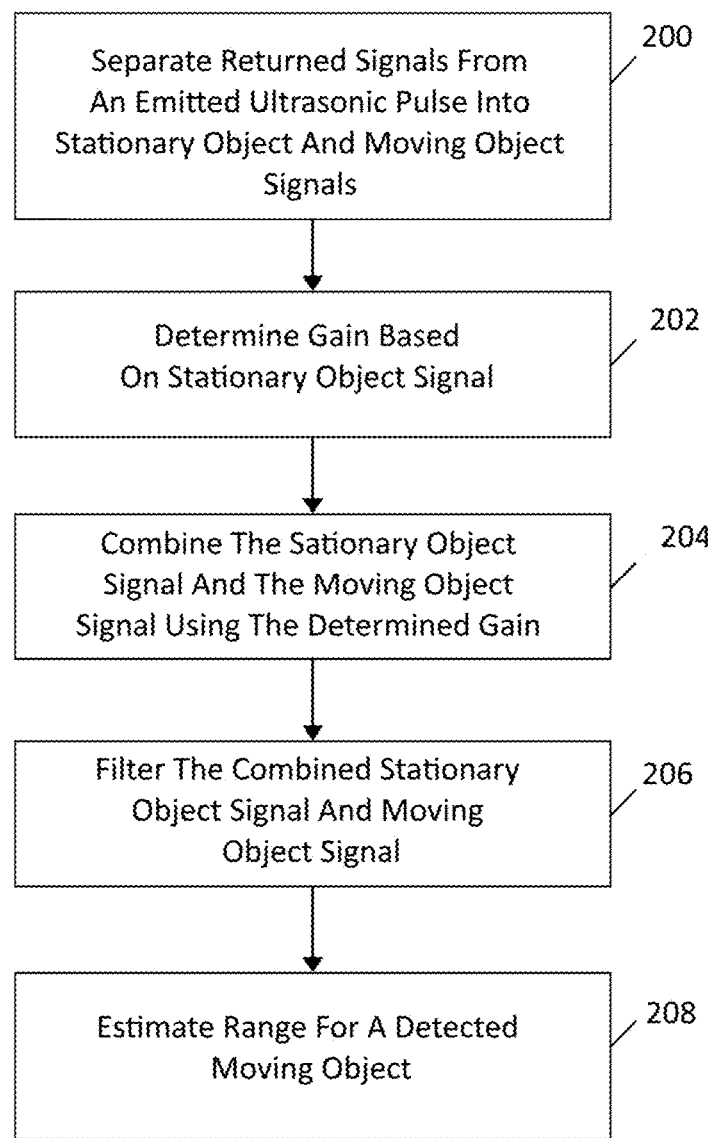
FIG. 2 illustrates a flow diagram of a method of estimating range with an ultrasonic transducer, in accordance with various embodiments.

To help illustrate aspects of the disclosed techniques, FIG. 2 illustrates a flow diagram of a method for estimating range using ultrasonic signals. As noted above, one or more ultrasonic transducers, such as ultrasonic transducer 150 emit an ultrasonic pulse and subsequently receive returned signals corresponding to echoes from objects within the sensed environment. Correspondingly, one suitable routine may begin as indicated in 200 by separating the returned signals into a stationary object signal and a moving object signal. A gain is then determined based at least in part on the stationary object signal in 202. The stationary object signal and the moving object signal are combined in 204, based at least in part on the determined gain. The combined stationary object signal and moving object signal is filtered in 206. As a result, in 208 a range may then be estimated for a detected moving object based at least in part on the filtered combined stationary and moving object signal.

Figure 3:
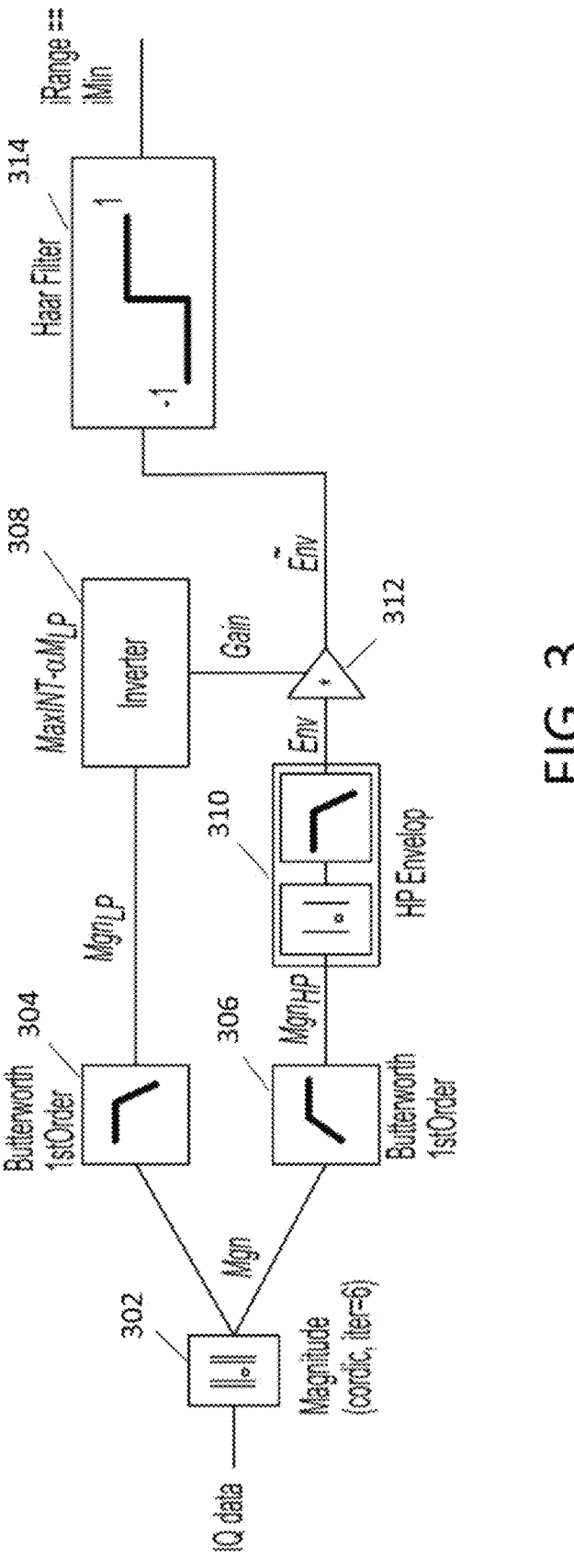
FIG. 3 illustrates a schematic signal processing diagram for estimating range with an ultrasonic transducer, in accordance with various embodiments.

One embodiment of a suitable architecture is depicted in FIG. 3 as a schematic signal processing diagram. As shown, the raw magnitudes 302 of returned signals received over a period of time by ultrasonic transducer 150 in a sensed environment such as a room, are fed into low pass filter 304 and high pass filter 306. In this embodiment, low pass filter 304 is configured as a Butterworth $1^{st}$ Order filter and its output corresponds to the reflections received from stationary objects and is termed herein a stationary object signal. Similarly, high pass filter 306 is also configured as a Butterworth $1^{st}$ Order filter and its output corresponds to the reflections received from moving objects and is termed herein a moving object signal. In this embodiment, the stationary object signal is used as a gain function, with inverter 308 configured to determine a gain function that is the inverse of the magnitude of the stationary object signal. As also shown in this embodiment, block 310 determines the envelope of the moving object signal by taking the absolute value of the moving object signal provided by high pass filter 306 and then applying a low pass filter. The stationary object signal and the moving object signal are then combined in block 312 by applying the gain from inverter 308 to the envelope of the moving object signal. As will be appreciated, this has the effect of normalizing moving object signal given that the gain is inversely related to the amplitude of the stationary object signal. This combined stationary object signal and moving object signal is then filtered in block 314 to increase the contrast between the stationary object components and the moving object components. In this embodiment, the Haar wavelet transform is used to decompose the signal into high-pass components to highlight rapid changes and low-pass components to smooth the signal. The output of block 314 is then used to estimate range by taking its minimum value. Since the minimum value can be a flat region in some cases, it may be desirable to use an amount in the range of approximately 80-90% of the minimum.

Figure 4:
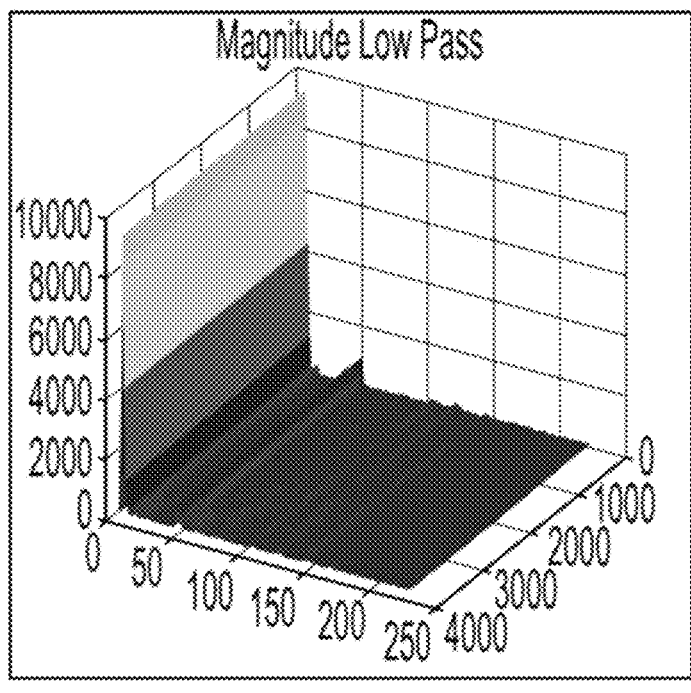
FIG. 4 illustrates the output of a low pass filter to separate a stationary object signal, in accordance with various embodiments.
Figure 5:
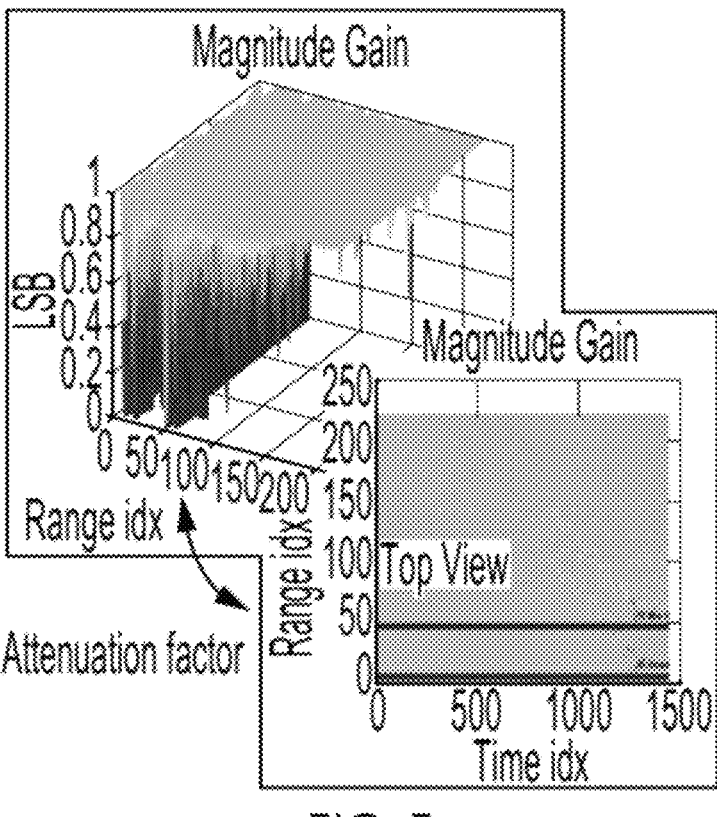
FIG. 5 illustrates the determination of a gain from a stationary object signal, in accordance with various embodiments.
Figure 6:
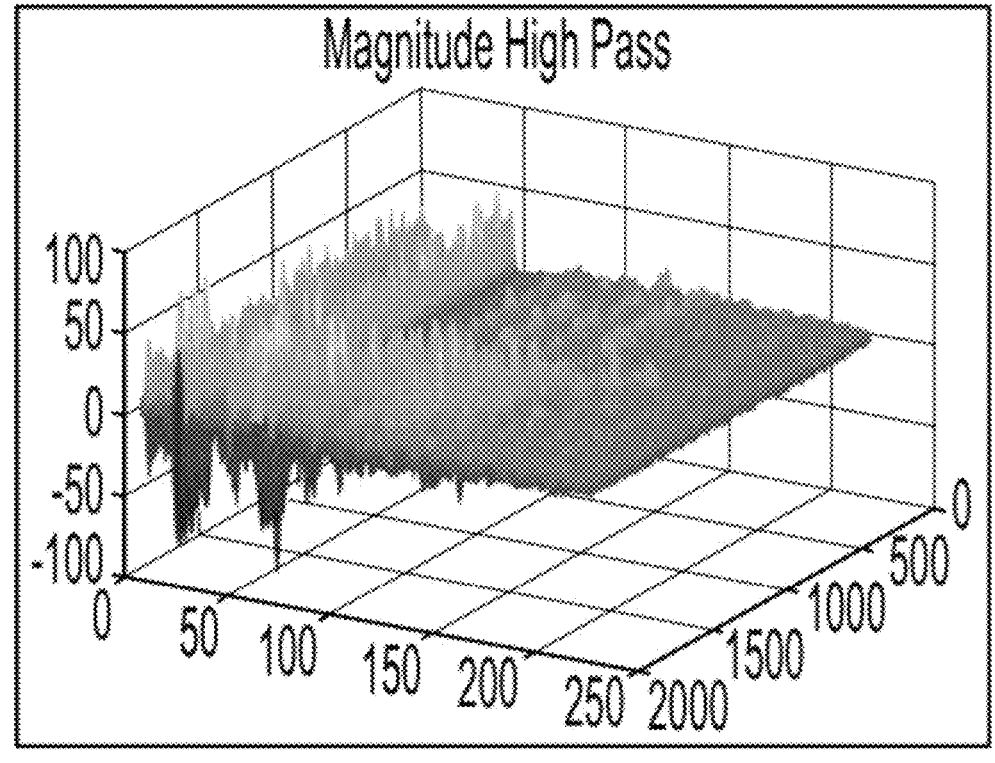
FIG. 6 illustrates the output of a high pass filter to separate a moving object signal, in accordance with various embodiments.
Figure 7:
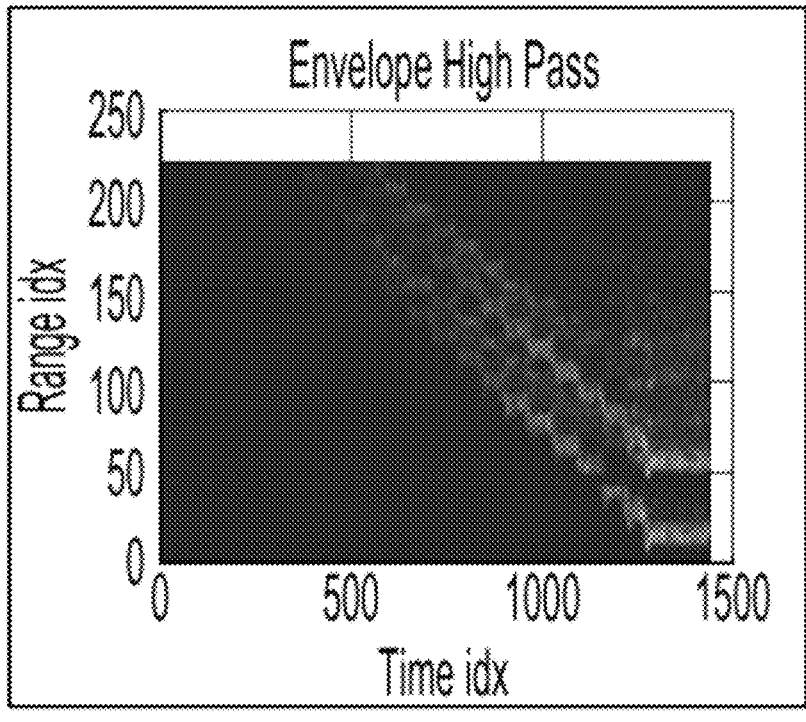
FIG. 7 illustrates the determination of the envelope of the moving object signal, in accordance with various embodiments.
Figure 8:
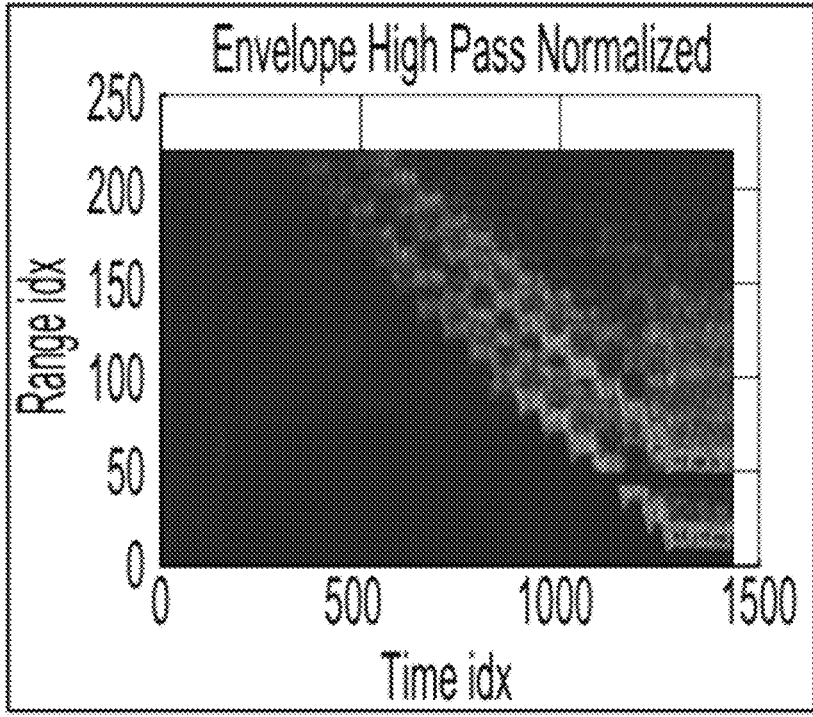
FIG. 8 illustrates the normalization of the envelope of the moving object signal, in accordance with various embodiments.
Figure 9:
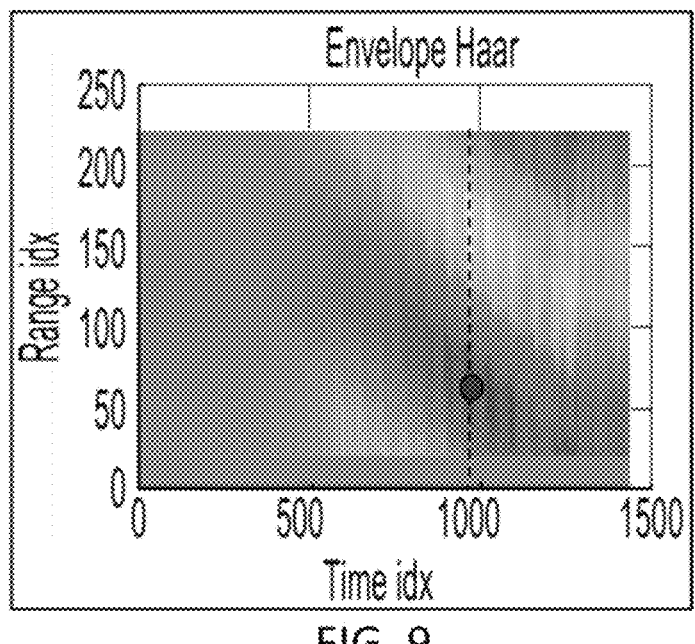
FIG. 9 illustrates the output from filtering a combined stationary object signal and moving object signal, in accordance with various embodiments.
Figure 10:
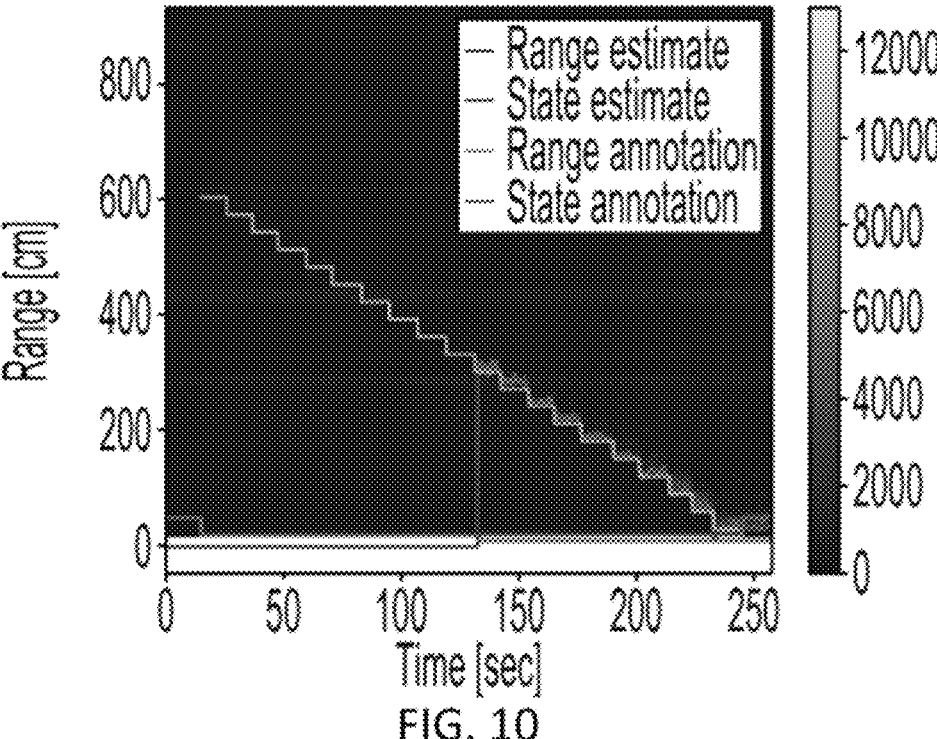
FIG. 10 illustrates the estimation of range from the filtered combined stationary object signal and moving object signal, in accordance with various embodiments.

To help illustrate the operation of the signal processing schematic of FIG. 3, FIGS. 4-11 graphically depict the relevant signals at various stages of the operation. Specifically, FIG. 4 shows the magnitude of the stationary object signal output by low pass filter 304 while FIG. 5 shows the attenuation that will be employed by the gain derived from the stationary object signal. Further, FIG. 6 shows the magnitude of the moving object signal output by high pass filter 306 and FIG. 7 shows the envelope of that signal as output by 310. Next, FIG. 8 shows the combined stationary object signal and moving object signal that has been normalized by attenuating the moving object envelope by the gain determined in 308 as an inverse of the magnitude of the stationary object signal. As may be seen in the comparison of FIG. 7 to FIG. 8, variation due to echoes from stationary objects, as determined from the stationary object signal, is significantly attenuated. Beneficially, this functions to reduce outliers that may be caused by stationary objects being misinterpreted as moving objects. As shown in FIG. 9, contrast in the normalized moving object signal is increased in the filtered output of 314. Finally, FIG. 10 depicts the range estimation that may be performed on the filtered combined stationary object and moving object signal. The range index from FIG. 9 may be converted to the distance shown in FIG. 10 based on the sampling frequency of the listening window. For example, at the epoch indicated in FIG. 9, the minimum value of the filtered combined stationary object and moving object signal allows for estimation of the range to be initiated. As also indicated in this figure, the range estimation can be adjusted along the contrast slope (or edge), as an example using threshold crossing where threshold is set as a percentage between contrast extremums as shown.

While the above discussion has primarily concerned the specific embodiment shown in FIG. 3, it should be appreciated that various modifications are within the scope of this disclosure. For example, instead of the absolute value function employed to determine the envelope of the moving object signal, other nonlinear functions may used instead, such as square. In yet other embodiments, variance over time may be employed instead of the envelope. Additionally, the Haar filter represented by block 314 may be implemented in different ways, such as using 0-padding to run over the limited window, circular filtering, or normalizing by number of samples (e.g., same weight for $-1/\text{Nbr\_negative\_samples}$ and $+1/\text{Nbr\_positive\_samples}$). More fundamentally, other filtering techniques may be employed to increase contrast between high-pass and low-pass components, such as by using other wavelet transforms or other bandpass filters along suitable ranges. Still further, it was noted above the in some instances, rather than the minimum value of the filtered combined stationary object and moving object signal, an amount in the range of approximately 80-90% of the minimum may be employed when a relatively flat region is involved. More generally, a range that maximizes the contrast (filter output) minus the filter delay group may be suitable.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. In some configurations, a substrate portion known as a MEMS cap provides mechanical support for the MEMS structure. The MEMS structural layer is attached to the MEMS cap. The MEMS cap is also referred to as handle substrate or handle wafer. In the described embodiments, an electronic device incorporating a sensor may employ a sensor tracking module also referred to as Sensor Processing Unit (SPU) that includes at least one sensor in addition to electronic circuits. The sensors may be formed on a first substrate. Other embodiments may include solid-state sensors or any other type of sensors. The electronic circuits in the SPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package.

In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Motion data may refer to processed and/or raw data. Processing may include applying a sensor fusion algorithm or applying any other algorithm. In the case of a sensor fusion algorithm, data from a plurality of sensors may be combined to provide, for example, an orientation of the device. In the described embodiments, a SPU may include processors, memory, control logic and sensors among structures.

As discussed above, this disclosure is directed to a device having an ultrasonic transducer configured to emit an ultrasonic pulse and receive returned signals corresponding to the emitted ultrasonic pulse. At least one processor coupled with the ultrasonic transducer may be configured to separate the returned signals into a stationary object signal and a moving object signal, determine a gain based at least in part on the stationary object signal; combine the stationary object signal with the moving object signal using the gain, filter the combined stationary object signal and moving object signal and estimate a range for a moving object based at least in part on the filtered combined stationary and moving object signal.

In one aspect, the at least one processor may be configured to remove a high frequency component from the returned signals using low pass filtering to generate the stationary object signal. The at least one processor may be configured to remove a low frequency component from the returned signals using high pass filtering, process the filtered signal, and remove a high frequency component to generate the moving object signal. The at least one processor may also be configured to process the filtered signal by computing an absolute value of a magnitude after removing the low frequency component or by applying a nonlinear function after removing the low frequency component.

In one aspect, the at least one processor may be configured to determine the gain by inverting a magnitude of the stationary object signal.

In one aspect, the at least one processor may be configured to combine the stationary object signal with the moving object signal by multiplying the moving object signal with the gain.

In one aspect, the at least one processor may be configured to filter the combined stationary object signal and moving object signal by increasing contrast between the stationary object signal and the moving object signal. The at least one processor may be configured to increase contrast between the stationary object signal and the moving object signal by applying a bandpass filter.

In one aspect, the at least one processor may be configured to estimate the range for the moving object by taking a minimum value of the filtered combined stationary and moving object signal. The at least one processor may also be configured to estimate the range for the moving object by taking a range that increases contrast of the filtered combined stationary and moving object signal.

This disclosure may include a sensor processing unit, including an ultrasonic transducer configured to emit an ultrasonic pulse and receive returned signals corresponding to the emitted ultrasonic pulse and at least one sensor processor coupled with the ultrasonic transducer and configured to remove a high frequency component from the returned signals using low pass filtering to generate the stationary object signal. The at least one processor may be configured to remove a low frequency component from the returned signals using high pass filtering, process the filtered signal, and remove a high frequency component to generate the moving object signal. The at least one processor may also be configured to process the filtered signal by computing an absolute value of a magnitude after removing the low frequency component or by applying a nonlinear function after removing the low frequency component.

In one aspect, the at least one processor may be configured to determine the gain by inverting a magnitude of the stationary object signal.

In one aspect, the at least one processor may be configured to combine the stationary object signal with the moving object signal by multiplying the moving object signal with the gain.

In one aspect, the at least one processor may be configured to filter the combined stationary object signal and moving object signal by increasing contrast between the stationary object signal and the moving object signal. The at least one processor may be configured to increase contrast between the stationary object signal and the moving object signal by applying a bandpass filter.

In one aspect, the at least one processor may be configured to estimate the range for the moving object by taking a minimum value of the filtered combined stationary and moving object signal. The at least one processor may also be configured to estimate the range for the moving object by taking a range that increases contrast of the filtered combined stationary and moving object signal.

Further, this disclosure is also directed to a method for employing an ultrasonic sensor to estimate range. The method may involve separating, employing at least one a processor coupled with an ultrasonic transducer, returned signals received by the ultrasonic transducer and corresponding to a pulse emitted by the ultrasonic transducer into a stationary object signal and a moving object signal, determining a gain based at least in part on the stationary object signal, combining the stationary object signal with the moving object signal using the gain, filtering the combined stationary object signal and moving object signal and estimating the range for the moving object based at least in part on the filtered combined stationary and moving object signal.

In one aspect, the method may involve removing a high frequency component from the returned signals using low pass filtering to generate the stationary object signal. The method may also involve removing a low frequency component from the returned signals using high pass filtering, processing the filtered signal, and removing a high frequency component to generate the moving object signal. Still further, the method may involve processing the filtered signal by computing an absolute value of a magnitude after removing the low frequency component or by applying a nonlinear function after removing the low frequency component.

In one aspect, the method may involve determining the gain by inverting a magnitude of the stationary object signal.

In one aspect, the method may involve combining the stationary object signal with the moving object signal by multiplying the moving object signal with the gain.

In one aspect, the method may involve filtering the combined stationary object signal and moving object signal by increasing contrast between the stationary object signal and the moving object signal. The method may also involve increasing contrast between the stationary object signal and the moving object signal by applying a bandpass filter.

In one aspect, the method may involve estimating the range for the moving object by taking a minimum value of the filtered combined stationary and moving object signal. The method may also involve estimating the range for the moving object by taking a range of minimum values of the filtered combined stationary and moving object signal.

Although the present invention has been described in accordance with the embodiments shown, one of ordinary skill in the art will readily recognize that there may be variations to the embodiments and those variations would be within the spirit and scope of the present invention. One skilled in the art may readily devise other systems consistent with the disclosed embodiments which are intended to be within the scope of this disclosure.

What is claimed is:
1. A device comprising:
an ultrasonic transducer configured to emit an ultrasonic pulse and receive returned signals corresponding to the emitted ultrasonic pulse; and
at least one processor coupled with the ultrasonic transducer and configured to:
separate the returned signals into a stationary object signal and a moving object signal;
determine a gain based at least in part on the stationary object signal;
combine the stationary object signal with the moving object signal using the gain;
filter the combined stationary object signal and moving object signal; and estimate a range for a moving object based at least in part on the filtered combined stationary and moving object signal.

2. The device of claim 1, wherein the at least one processor is configured to remove a high frequency component from the returned signals using low pass filtering to generate the stationary object signal.

3. The device of claim 2, wherein the at least one processor is configured to remove a low frequency component from the returned signals using high pass filtering, process the filtered signal, and remove a high frequency component to generate the moving object signal.

4. The device of claim 3, wherein the at least one processor is configured to process the filtered signal by computing an absolute value of a magnitude after removing the low frequency component.

5. The device of claim 3, wherein the at least one processor is configured to process the filtered signal by applying a nonlinear function after removing the low frequency component.

6. The device of claim 1, wherein the at least one processor is configured to determine the gain by inverting a magnitude of the stationary object signal.

7. The device of claim 1, wherein the at least one processor is configured to combine the stationary object signal with the moving object signal by multiplying the moving object signal with the gain.

8. The device of claim 1, wherein the at least one processor is configured to filter the combined stationary object signal and moving object signal by increasing contrast between the stationary object signal and the moving object signal.

9. The device of claim 8, wherein the at least one processor is configured to increase contrast between the stationary object signal and the moving object signal by applying a bandpass filter.

10. The device of claim 1, wherein the at least one processor is configured to estimate the range for the moving object by taking a minimum value of the filtered combined stationary and moving object signal.

11. The device of claim 1, wherein the at least one processor is configured to estimate the range for the moving object by taking a range that increases contrast of the filtered combined stationary and moving object signal.

12. A sensor processing unit comprising:
   an ultrasonic transducer configured to emit an ultrasonic pulse and receive returned signals corresponding to the emitted ultrasonic pulse; and
   at least one sensor processor coupled with the ultrasonic transducer and configured to:
separate the returned signals into a stationary object signal and a moving object signal;
determine a gain based at least in part on the stationary object signal;
combine the stationary object signal with the moving object signal using the gain;

filter the combined stationary object signal and moving object signal; and
estimate a range for a moving object based at least in part on the filtered combined stationary and moving object signal.

13. A method for employing an ultrasonic sensor to estimate a range for a moving object, comprising:
   separating, employing at least one a processor coupled with an ultrasonic transducer, returned signals received by the ultrasonic transducer and corresponding to a pulse emitted by the ultrasonic transducer into a stationary object signal and a moving object signal;
   determining a gain based at least in part on the stationary object signal;
   combining the stationary object signal with the moving object signal using the gain;
   filtering the combined stationary object signal and moving object signal; and
   estimating the range for the moving object based at least in part on the filtered combined stationary and moving object signal.

14. The method of claim 13, further comprising removing a high frequency component from the returned signals using low pass filtering to generate the stationary object signal.

15. The method of claim 14, further comprising removing a low frequency component from the returned signals using high pass filtering, processing the filtered signal, and removing a high frequency component to generate the moving object signal.

16. The method of claim 15, further comprising processing the filtered signal by computing an absolute value of a magnitude after removing the low frequency component.

17. The method of claim 15, further comprising processing the filtered signal by applying a nonlinear function after removing the low frequency component.

18. The method of claim 13, further comprising determining the gain by inverting a magnitude of the stationary object signal.

19. The method of claim 13, further comprising combining the stationary object signal with the moving object signal by multiplying the moving object signal with the gain.

20. The method of claim 13, further comprising filtering the combined stationary object signal and moving object signal by increasing contrast between the stationary object signal and the moving object signal.

21. The method of claim 20, further comprising increasing contrast between the stationary object signal and the moving object signal by applying a bandpass filter.

22. The method of claim 13, further comprising estimating the range for the moving object by taking a minimum value of the filtered combined stationary and moving object signal.

23. The method of claim 13, further comprising estimating the range for the moving object by taking a range of minimum values of the filtered combined stationary and moving object signal.

* * * * *